United States Patent

Schroeter et al.

[15] 3,696,123

[45] Oct. 3, 1972

[54] DIHYDROCARBONOXYOXETHANES

[72] Inventors: Siegfried H. Schroeter, 54 Division St., Schenectady, N.Y. 12304; Charles M. Orlando, 749 Central Parkway, Schenectady, N.Y. 12309

[22] Filed: March 19, 1970

[21] Appl. No.: 24,981

Related U.S. Application Data

[62] Division of Ser. No. 732,901, May 29, 1968, Pat. No. 3,616,358.

[52] U.S. Cl..................260/333, 204/158, 260/2 XA
[51] Int. Cl. ...............................................C07d 3/00
[58] Field of Search......................................260/333

[56] References Cited

OTHER PUBLICATIONS

S. H. Schroeter et al., Jour. Org. Chem., Vol. 34(5), May 1969, pp. 1,181– 1,187.

*Primary Examiner*—Norma S. Milestone
*Attorney*—Richard R. Brainard, Paul A. Frank, Joseph T. Cohen, Charles T. Watts, William T. Black, Frank L. Neuhauser, Oscar B. Waddell and Melvin M. Goldenberg

[57] ABSTRACT

Dihydrocarbonoxyoxetanes, such as 2,2-dialkoxyoxetane or 3,3-dialkoxyoxetane can be made by the reaction of an aldehyde or ketone with ketene acetals utilizing ultraviolet light. The dihydrocarbonoxetanes can be employed as starting materials in the preparation of polymers containing polytrimethylene oxide units. The dihydrocarbonoxetanes also can be polymerized with hydroxyl containing materials employing a catalyst such as boron trifluoride to yield hydroxy terminated polymers.

8 Claims, No Drawings

DIHYDROCARBONOXYOXETHANES

This application is a division of our copending application Ser. No. 732,901, filed May 29, 1968, entitled PHOTOSYNTHESIS OF DIHYDROCARBONOXYOXETANES and now U.S. Pat. No. 3,616,358.

This invention is concerned with a process for producing dihydrocarbonoxyoxetanes by irradiating a mixture of a ketene acetal of the formula, I 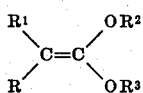

wherein R and $R^1$ are hydrogen, an alkyl group containing up to 10 carbon atoms or an aryl group containing up to 12 carbon atoms and $R^2$ and $R^3$ are alkyl groups containing from one to 10 carbon atoms or an aryl group containing up to 12 carbon atoms, with a carbonyl compounds of the formulas, II 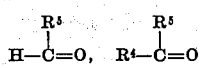

wherein $R^5$ is a member of the class consisting of alkyl groups containing from one to 20 or more carbon atoms and aryl groups containing up to 12 carbon atoms and $R^4$ is hydrogen or an $R^5$ group, or an alicyclic carbonyl compound of the formula, III 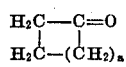

or its isomers illustrated by the formula,

IV $C_nH_{2n-2}=O$ wherein $a$ is an integer of from 1 to 10 and $n$ is an integer of from 4 to 13, in the presence of ultraviolet light having a wavelength of from 1,800 to 4,000 Angstroms. In formula I, R, $R^1$, $R^2$ and $R^3$ need not necessarily represent the same entity in the molecule within their meanings as defined.

The process of this invention is more readily illustrated by the following equation which for simplicity shows the reaction of ketene diethylacetal with acetone.

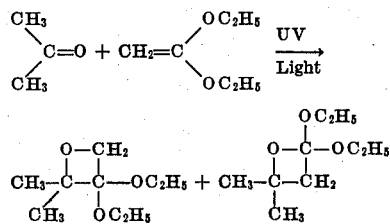

As can be seen from the equation, two isomeric oxetanes are produced. The oxetanes can be 2,2-dialkoxyoxetanes or diaryloxyoxetanes and 3,3-dialkoxyoxetanes or diaryloxyoxetanes. It has been found that in those instances wherein R''' is hydrogen, only the 3,3-isomers are produced and no 2,2-isomers are found.

The temperature at which the process of this invention is conducted is not critical. Temperatures from as low as −60°C to as high as 200°C or more can be employed in the process of this invention. It is preferred, however, to conduct the process at ambient temperature, that is, at temperatures from 10°C to 50°C for simplicity of equipment and ease of operation of the process.

The process of the present invention can be conducted at sub-atmospheric, atmospheric or super-atmospheric pressures. It is preferred, for simplicity and ease of operation, to conduct the process at atmospheric pressure and in the liquid phase.

The ratio of the aldehyde or ketone to the ketene acetal employed in the process of this invention is not narrowly critical and can range by weight from as little as 1 to 100 or more parts of the aldehyde or ketone to 100 to 1 part of the acetal.

A solvent is not necessary in conducting the process of this invention; either the carbonyl compound or the ketene acetal may serve as a solvent or diluent. A solvent can be employed if desired. If a solvent is employed, one may use, on a weight basis, from 1 to 1,000 parts of the solvent per 100 parts of the reactants. The solvents, other than the reactants, which are useful in conducting the process of this invention are those liquids in which the reactants and the reaction products are soluble and which do not absorb ultraviolet light in the region where the carbonyl reagents absorb ultraviolet light and which are not affected by ultraviolet light. Such solvents will vary with the nature of the carbonyl compound employed. Examples of such solvents are: pentane, hexane, benzene, diethylether, dibutylether, acetonitrile, tetrahydrofuran, N,N-dimethylformamide, N,N-dimethylacetamide, etc.

The alkyl radicals which R, R' $R^1$, and $R^2$ represent, are, for example; methyl, ethyl, isopropyl, tertiary butyl, octyl, decyl, etc; cycloalkyl radicals such as cyclopentyl, cyclohexyl, etc. The aryl radicals which $R_1$, $R^2$, and $R^3$ represent, are, for example; phenyl, xylyl, naphthyl, etc; aralkyl radicals such as benzyl, phenylethyl, phenylpropyl, etc; alkaryl radicals such as tolyl, xylyl, etc. Illustrative of the alkyl groups which $R^4$ and $R^5$ represent are, for example, methyl, ethyl, isopropyl, tertiary butyl, decyl, undecyl, octadecyl and the like. Illustrative of the aryl groups which $R^4$ and $R^5$ represent are, for example, phenyl, naphthyl, xenyl, tolyl, xylyl, etc.

Illustrative of the ketene acetals of Formula I that can be employed in the process of this invention are, for example, ketene dimethyl acetal, ketene diethyl acetal, methyl ketene diethyl acetal, phenyl ketene diethyl acetal, diphenyl ketene dipropyl acetal, phenyl methyl ketene dibutyl acetal, decyl ketene dibutyl acetal etc.

The carbonyl compounds of Formula II that are employed in the process of this invention include ketones and aldehydes. Illustrative of the ketones that can be employed in the process of this invention are, for example, the aliphatic ketones such as acetone, methyl ethyl ketone, diethyl ketone, dipropyl ketone, di-iso-propyl ketone, di-iso-butyl ketone, butyl ethyl ketone etc; the cyclic ketones of Formula III are, for example, cyclobutanone, cyclopentanone, cyclohexanone, cycloheptanone, cyclodecanone, cycloundecanone, and the alkyl substituted alicyclic ketones, etc; the mixed alkyl aryl ketones are, for example, phenyl methyl ketone, phenyl ethyl ketone, tolyl ethyl ketone, xylyl butyl ketone, etc.

Illustrative of the aldehydes which can be employed in the process of this invention, are, for example; acetaldehyde, propionaldehyde, butyraldehyde, octylaldehyde, decylaldehyde, octadecyl aldehyde, benzaldehyde, etc.

The novel compositions produced in accordance with the process of this invention are those having the formulas, V
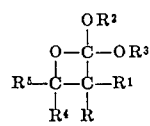

VI
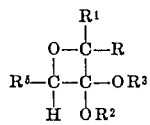

VII
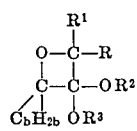

VIII
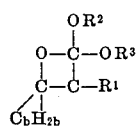

wherein R, R¹, R², R³, R⁴, and R⁵, and $a$ have the above defined meanings and, $b$ is an integer of from 3 to 12.

Illustrative of the oxetanes which are included in Formulas V, VI, VII, and VIII are, for example; 4,4-dimethyl-2,2-dimethoxyoxetane; 4,4-diphenyl-2,2-di-n-butoxyoxetane; 4-methyl-4-ethyl-2,2-dipropoxyoxetane; 4,4-diethyl-3,3-dimethyl-2,2-butoxyoxetane; 2,2-dimethyl-3,3-dimethoxyoxetane; 2,2-diphenyl-3,3-dimethoxyoxetane; 2,2-dimethyl-3,3-di-iso butoxyoxetane; 2,2-diethyl-4-phenyl-3,3-dibutoxyoxetane; 2,2-dimethoxy-1-oxaspiro[3.5]nonane; 3-phenyl-2,2-diethoxy-1-oxaspiro[3.5]nonane; 2,2-dimethoxy-1-oxaspiro[3.7]undecane; 2,2-dimethyl-3,3-dimethoxy-1-oxaspiro[3.5c;nonane; 3,3-di-n-butoxy-1-oxaspiro[3.4]octane; 2-phenyl-3,3-di-iso-butoxy-oxaspiro[3.6]decane; 3,3-dimethoxy-1-oxaspiro[3.8]dodecane; etc.

The dialkoxyoxetanes produced in accordance with the process of this invention are useful as starting materials in the preparation of polymers containing the polytrimethylene oxide unit. For instance, they may be polymerized by Friedel-Crafts catalysts, in accordance with the procedures described in U.S. Pat. No. 2,905,647, issued Sept. 22, 1959 and U.S. Pat. No. 2,722,520, issued Nov. 1, 1955, or by employing trialkylaluminum catalyst, for example, as described in U.S. Pat. Nos. 2,895,921 and 2,895,922 issued July 21, 1959. The oxetanes produced by the process of this invention can also be copolymerized with other oxetanes to form copolymers.

The high molecular weight polyoxetanes produced by the polymerization processes described above can then be compounded with fillers and curing agents, for example, dialkylperoxides or diarylperoxides, such as, di-tertiary-butylperoxide and dibenzoylperoxide and the like and cured to elastomers which are useful as gaskets, elastic hose, electrical insulation, etc.

The oxetanes produced in accordance with this invention can also be polymerized with other oxetanes and hydroxyl-containing materials employing a catalyst such as boron trifluoride to yield hydroxyl-terminated polymers which are useful in producing polyurethanes by the reaction of these hydroxy-containing polymers with tolylene di-iso-cyanate in the presence of tertiary amines according to known processes.

The 2,2-dihydrocarbonoxyoxetanes can be hydrolyzed by aqueous acid solutions to yield 3-hydroxy alkyl esters and 3-hydroxy alkyl acids, which can be converted into α, β-unsaturated acids and esters by heating. These α, β-unsaturated acids and esters can be polymerized to polyacrylates which are useful as ion exchange resins, etc.

The following examples serve to further illustrate the invention. All parts are by weight unless otherwise expressly set forth.

EXAMPLE 1

Ketene diethylacetal (59 grams) was dissolved in dry acetone (237 grams) and the solution irradiated for 22 hours in an internally water cooled quartz reactor employing a 450 watt medium pressure mercury lamp and a Vycor 7910 glass filter which allowed ultraviolet light having a wavelength of greater than 2,500 Angstroms to irradiate the solution. The acetone was then evaporated off in a vacuum and the residue distilled to give 46.3 grams of a material having a boiling point of from 60°C to 90°C at 14 millimeters Hg, 3.8 grams of a material having a boiling point from 65°C to 100°C at 0.3 mm of Hg, and 1.8 grams of polymeric residue. The first fraction was analyzed by nuclear magnetic resonance spectroscopy. Integration over the singlets at 5.78τ and 7.64τ indicated the presence of a 73/27 mixture of 3,3- and 2,2-diethoxy-4,4-dimethyloxetanes. The distillation of the first fraction through an 80 centimeter spinning band column gave pure 3,3-diethoxy-4,4-dimethyloxetane (20.1 grams; b.p. 62.5°C/12 mm Hg). A fraction having a boiling point of from 55°C to 57°C/12 mm Hg pressure was found to contain approximately 90 percent, by weight, of 2,2-diethoxy-4,4-dimethyloxetane.

The 3,3-diethoxy-4,4-dimethyloxetane was identified by infrared and nuclear resonance spectral analysis. Elemental analysis gave the following results:

Calculated: mol. wt., 174; C, 62.04%; H, 10.41%
Found: mol. wt., 180; C, 62.05%; H, 10.51%

The 4,4-dimethyl - 2,2-diethoxyoxetane was further characterized by reduction to 3-methyl-3-hydroxybutyraldehyde diethylacetal by lithium aluminum hydride. The acetal was identified by spectral data and elemental analysis.

Calculated: mol. wt., 176.25; C, 61.33%; H, 11.44%
Found: mol. wt., 180; C, 61.35%; H, 11.65%

EXAMPLE 2

A solution of ketene diethylacetal (50 grams) in cyclohexanone (250 grams) was irradiated by the same procedure as in Example 1 for 19.5 hours. The reaction mixture was distilled through a spinning band column to yield 60 grams of a fraction (b.p. 65°C to 105°C/0.5 mm Hg) which was identified by nuclear magnetic resonance analysis as being a 70/30 mixture of 3,3-diethoxy- and 2,2-diethoxy-1-oxaspiro[3.5]-nonane. Redistillation of this fraction yielded pure 3,3-diethoxy-1-oxaspiro[3.5]nonane (b.p. 85 to 86°C/2.0 mm Hg) which gave the following analysis:

Calculated: Carbon, 67.25%; Hydrogen, 10.35%
Found Carbon, 67.15%; Hydrogen, 10.42%

A second fraction (b.p. 78 to 80°C/2.0 mm Hg) was identified as being predominantly 2,2-diethoxy-1-oxaspiro[3.5]nonane by infrared and nuclear magnetic resonance analysis. This oxetane was further characterized by its hydrolysis which gave (1-hydroxy) cyclohexyl ethylacetate, identified by its spectral data and elemental analysis.

Calculated: mol wt., 186.24; C, 64.49%; H, 9.74%
Found mol. wt., 190; C, 64.63%; H, 9.85%

EXAMPLE 3

A solution of freshly distilled propionaldehyde (30 grams) and ketene diethylacetal (60 grams) in 250 ml of dry pentane was irradiated as described in Example 1 for 24 hours. Pentane was removed by vacuum evaporation and the residue distilled under vacuum to afford 34.52 grams of a fraction (b.p. 70 to 90°C/18 mm Hg) which consisted mostly of the oxetane. Redistillation of this fraction through a spinning band column yielded pure 2-ethyl-3,3-diethoxyoxetane (b.p. 74.5°C/c MM Hg). The structure of this oxetane was confirmed by infrared and nuclear magnetic resonance analysis and elemental analysis.

Calculated: mol. wt., 174.23; C, 62.04%; H, 10.41%
Found mol. wt., 178; C, 62%; H, 10.6 %

EXAMPLE 4

A solution of freshly distilled benzaldehyde (31.8 grams) and ketene diethylacetal (38.5 grams) in 400 ml of dry benzene was irradiated under nitrogen in an internally water cooled Pyrex reactor with a 450 watt mercury lamp. During irradiation the solution turned an intense yellow. Evaporation of the benzene in vacuo left a residue that yielded 17.44 grams of crude oxetane (b.p. 110 to 140°C/0.1 mm Hg). Redistillation of this fraction through a 60 centimeter spinning band column yielded pure 2-phenyl-3,3-diethoxyoxetane (b.p. 85°C/0.3 mm Hg). The identity of the 3,3-diethoxyoxetane was confirmed by infrared and nuclear magnetic resonance analysis and elemental analysis.

Calculated: mol. wt., 222.24; C, 70.24%; H, 8.16%
Found mol. wt., 213; C, 70.34%; H, 8.19%

EXAMPLE 5

A solution of benzophenone (15 grams) and ketene diethylacetal (10.4 grams) in 220 ml of dry benzene was irradiated as described in Example 4 for 13 hours. The light yellow solution was concentrated in vacuo to leave 25 grams of a yellow liquid. Vacuum distillation of this liquid yielded 10.34 grams of a colorless liquid (b.p. 120°C/0.01 mm Hg) which was shown to be a 40/60 mixture of 2,2-diphenyl-3,3-diethoxyoxetane and benzophenone by vapor phase chromatographic analysis and a second fraction of 2.33 grams which solidified on standing. Recrystallization of the second fraction from hexane yielded pure 2,2-diphenyl-3,3-diethoxyoxetane as colorless plates having a melting point of 68 to 70°C. This structure was confirmed by nuclear magnetic resonance spectral analysis and elemental analysis Calculated: mol. wt., 298.33; C, 76.48%; H, 7.43%
Found: mol. wt., 296; C, 76.48%; H, 7.54%

EXAMPLE 6

A solution of methyl ketene diethylacetal (55 grams) in dry acetone (190 ml) was irradiated as described in Example 1 for 24 hours. Evaporation of the acetone under vacuum left a colorless residue that was distilled to yield 38 grams of a fraction (b.p. 60 to 65°C/15 mm Hg). Nuclear magnetic resonance analysis indicated this fraction to be a mixture of 2,2,3-trimethyl-4,4-diethoxyoxetane and 2,2,4-trimethyl-3,3-diethoxyoxetane. Pure 2,2,4-trimethyl-3,3-diethoxyoxetane was obtained by preparative gas chromatography at 125°C on a 6 foot column packed with Apiezon L on Chromosorb W. Elemental analysis:

Calculated: mol. wt., 188.23; C, 63.81%; H, 10.71%
Found: mol. wt., 190; C, 63.51%; H, 10.48%

2,2,3-Trimethyl-4,4-diethoxyoxetane was also isolated by preparative gas chromatography. Its nuclear magnetic resonance spectrum showed a characteristic quartet at 7.38τ (1-Proton) whereas the isomeric oxetane showed a quartet at 5.55τ (1-Proton). 2,2,3-Trimethyl-4,4-diethoxyoxetane was further characterized by hydrolysis to 2,3-dimethyl-3-hydroxy ethylbutyrate which was characterized by spectral data and elemental analysis.

Calculated: mol. wt., 160.21; C, 59.98%; H, 10.07%
Found: mol. wt., 156; C, 60%; H, 10.10%

Reduction of the oxetane with lithium aluminum hydride gave 2,3-dimethyl-3-hydroxybutyraldehyde diethyl acetal which was identified via spectral data and elemental analysis.

Calculated: mol. wt., 190.28; C, 63.12%; H, 11.65%
Found: mol. wt., 197; C, 62.91%; H, 11.56%

EXAMPLE 7

A solution of dimethylketene diethylacetal (10.0 grams) in dry acetone, (100 grams) was irradiated as described in Example 1 for 6 hours. Evaporation of the acetone under vacuum and distillation of the residue through a 25 centimeter spinning band column yielded 8.5 grams of a mixture of isomeric oxetanes (b.p. 45 to 65°C/7 mm Hg).

EXAMPLE 8

A solution of diphenylketene dimethyl acetal (10 grams) and freshly distilled benzaldehyde (4.34 grams) in 280 ml of dry benzene was irradiated as described in Example 4 for 11 hours. Evaporation of the benzene under vacuum and distillation of the residue yielded 6.4 grams of a mixture of unreacted ketene acetal and an oxetane (b.p. 120 to 130°C/0.05mm Hg) and 5.6 grams of a residue which crystallized upon standing to yield a pure oxetane derivative having a melting point of 105° to 108°C when recrystallized from hexane. Elemental analysis of the oxetane derivative gave the following results:

Calculated: mol. wt., 346.37; C, 79.74%; H, 6.40%
Found: mol. wt., 340; C, 79.67%; H, 6.36%.

It will, of course, be apparent to those skilled in the art that modifications other than those set forth in the above examples, such as temperatures, ratio of reactants, pressures, and the like can be employed in the process of this invention, without departing from the scope thereof. One can also employ other aldehydes and ketones of Formula II, or other ketene acetals within the scope of Formula I without departing from the scope of this invention.

What is claimed is:

1. Alkoxyoxetanes selected from the class consisting of compounds having the formulas,

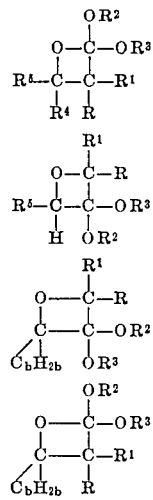

where R and $R^1$ are members selected from the class consisting of hydrogen, alkyl groups containing up to eight carbon atoms and aryl groups containing up to eight carbon atoms, $R^2$ and $R^3$ are members selected from the class consisting of alkyl groups containing up to eight carbon atoms and aryl groups containing up to eight carbon atoms, $R^4$ and $R^5$ are members of the class consisting of alkyl groups containing up to eight carbon atoms and aryl groups containing up to eight carbon atoms, and $b$ is an integer equal to from three to 12 inclusive.

2. An alkoxyoxetane as in claim 1 which has the formula,

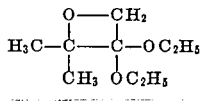

3. An alkoxyoxetane as in claim 1 which has the formula,

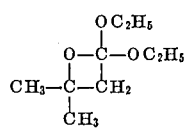

4. An alkoxyoxetane in accordance with claim 1, which has the name, 2,2,4-trimethyl-3,3-diethoxyoxetane.

5. An alkoxyoxetane in accordance with claim 1, which has the name, 2,2-diphenyl-3,3-diethoxyoxetane.

6. An alkoxyoxetane in accordance with claim 1, which has the name, 2-phenyl-3,3-diethoxyoxetane.

7. An alkoxyoxetane in accordance with claim 1 which has the name, 2-ethyl-3,3-diethoxyoxetane.

8. An alkoxyoxetane in accordance with claim 1, which has the name, 3,3-diethoxy-1-oxaspiro[3.5]-nonane.

* * * * *